United States Patent Office 3,365,475
Patented Jan. 23, 1968

3,365,475
PROCESS FOR THE PREPARATION OF 17α-(3'-HYDROXY-PROPYL)-4-ANDROSTENE-3β,17β-DIOL
Raymond A. Firestone, Fanwood, and Meyer Sletzinger, North Plainfield, N.J., assignors to Merck & Co., Inc., Rahway, N.J., a corporation of New Jersey
No Drawing. Filed July 22, 1966, Ser. No. 567,071
7 Claims. (Cl. 260—397.5)

This invention relates to a process for the preparation of an intermediate useful in the preparation of steroidal 17-spirotetrahydrofurans, more particularly this invention relates to the conversion of 17α-allyl-5-androstene-3β,17β-diol (Compound I) to 17α-(3'-hydroxypropyl)-4-androstene-3β,17β-diol (Compound II) by reaction of the former with a hydroboration reagent and subsequent oxidation of the resulting organoborane. Compound II is an intermediate which has utility in the preparation of 2',3'α - tetrahydrofuran - 2' - spiro - 17(4 - androsten-3-one) (Compound V) which possesses useful therapeutic properties as an aldosterone inhibitor. An aldosterone inhibitor blocks the salt-retaining steroids and thereby has utility in the treatment of diseases, such as congestive heart failure, nephrosis, and cirrhosis of the kidney in which aldosterone secretion is increased.

The preparation of Compound II and the conversion of Compound II to Compound V is illustrated in the following flow sheet, wherein X represents an alkyl or aryl sulfonyl group.

clohexylborane, bis - (trans - 2 - methylcyclohexyl) - borane, diisopinocampheylborane and disiamylborane. The reaction is accomplished in solution in an anhydrous inert organic solvent, such as terahydrofuran or diglyme (dimethyl ether of diethylene glycol) and preferably under an atmosphere of nitrogen. It is preferred that the hydroboration reagent be freshly prepared. This may be accomplished by adding boron trifluoride ethyl etherate slowly to a stirred slurry of sodium borohydride in the inert organic solvent and the unsaturated hydrocarbon which corresponds to the organic part of the hydroboration reagent. The temperature of the reaction mixture is maintained within the range of from about —5 to about —10° C. during the addition. After addition is complete, the reaction mixture is stirred for a period of about 30 minutes while the temperature is maintained at about 0° C. After the initial period of stirring, the reaction mixture is allowed to come to a temperature of about 25° C. and stirred at this temperature for about 2½ hours. A solution of Compound II in an inert organic solvent, preferably the same solvent used in the preparation of the hydroboration agent, is added rapidly to the solution of the hydroboration agent which is at a temperature of about —20° C. The rate of addition of the solution of Compound II to the solution of the hydroboration reagent is adjusted so that the temperature of the reaction mixture is maintained below about —15° C. After addition is complete, the reaction mixture is allowed to come to a temperature of about 0° C. and stirred at that

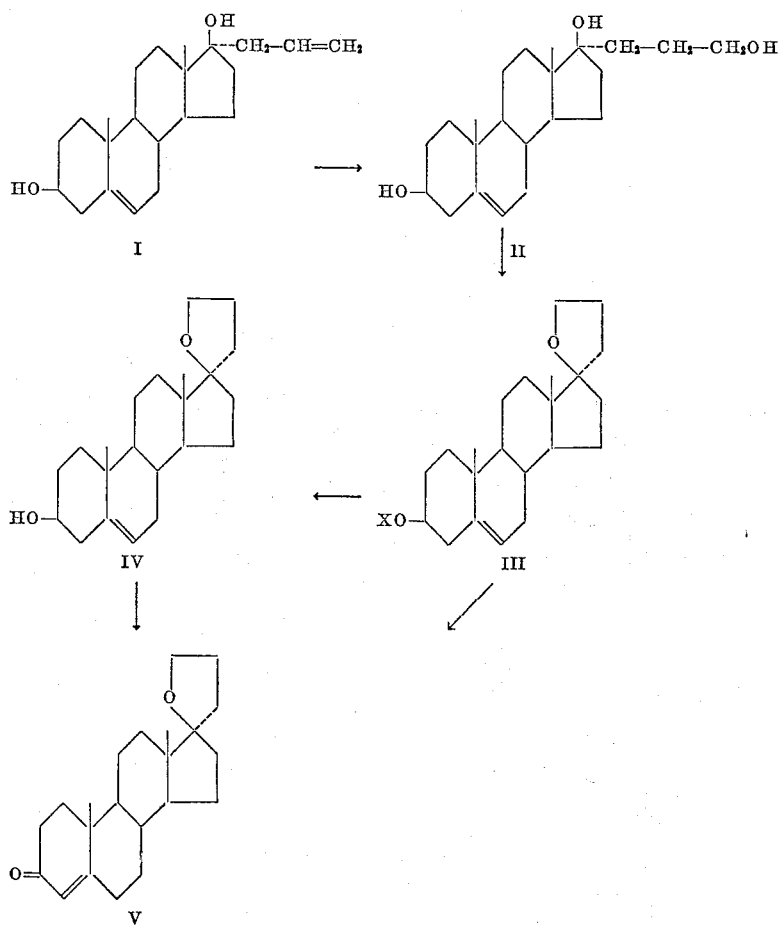

In the conversion of Compound I to Compound II, Compound I is reacted with a hydroboration agent having large steric requirements, such as thexylborane, dicy- temperature for several hours. Oxidation of the organoborane may be accomplished by making the reaction mixture alkaline, such as by adding an aqueous solution of sodium hydroxide, preferably about 3 normal, to the solution of the organoborane which is at a temperature of about −15° C., allowing the temperature to rise to about 0° C. and adding hydrogen peroxide. After the addition of hydrogen peroxide, the temperature of the reaction mixture is allowed to come to about 20 to 30° C. and is stirred at this temperature for from 1 to 2 hours. Any excess hydrogen peroxide in the reaction mixture is destroyed by the addition of dilute aqueous sodium bisulfite solution. The inert organic solvent is removed from the reaction mixture by distillation under reduced pressure and the residue, which comprises a slurry containing Compound II in crystalline form, is filtered. Compound II recovered by filtration is washed until acid-free by cold water and dried. Compound II may be purified by recrystallization from pyridine.

The first step in the conversion of Compound II to Compound V is the reaction of Compound II with an alkyl or aryl sulfonyl chloride in pyridine solution. The alkyl or aryl sulfonyl chloride is added to the solution of Compound II in pyridine solution and the solution, after flushing the container with nitrogen, is stirred for several hours while the temperature is maintained at about 0° C. After the reaction is complete, water and ice are added and the precipitate which forms is removed by extraction with a suitable solvent, such as ethyl acetate. The extract is immediately washed with cold aqueous dilute mineral acid, such as sulfuric acid, washed with water, washed with dilute aqueous sodium bacorbonate solution, dried over anhydrous magnesium sulfate and filtered. The solvent is removed by distillation under reduced pressure. The residue is 2′,3′α-tetrahydrofuran-2′-spiro-17-(3β-alkyl or aryl sulfonyloxy - 4 - androstene) (Compound III).

Compound III may be converted in a one-step process to Compound V by the oxidation of Compound III with dimethylsulfoxide under mildly alkaline conditions. In conducting the oxidation, a solution of Compound III in dimethylsulfoxide containing a mild alkali, such as sodium bicarbonate, lutidine or collidine, is heated at a temperature of from about 100 to 150° C. for several hours and then cooled to room temperature. Water is added to the cooled reaction mixture and the precipitate which forms is removed by extraction with a suitable solvent, such as ether. The extract is separated, washed with water, washed with dilute aqueous sulfuric acid solution, washed with dilute aqueous sodium bicarbonate solution, dried over anhydrous magnesium sulfate and filtered. The solvent is removed by distillation under reduced pressure. The residue is Compound V.

Compound III may also be converted to Compound V by a two-step process. The first step comprises heating, such as by refluxing, a solution of Compound III in a water-soluble organic solvent, such as a lower aliphatic ketone, or a lower aliphatic alcohol, more particularly, acetone, methylethylketone, methanol, ethanol, or propanol, containing a small amount of water. The solution is cooled and water is added in an amount sufficient to precipitate the reaction product. The precipitate is removed by filtration and washed with water and dried at room temperature under high vacuum. The precipitate is 2′,3′α-tetrahydrofuran - 2′ - spiro-17-(5-androstene-3β-ol) (Compound IV).

The 3β-hydroxy group of Compound IV may be oxidized to a keto group to provide Compound V by the use of aluminum isopropoxide and cyclohexanone in an inert solvent, such as benzene or toluene. A solution of Compound IV in the inert organic solvent which contains the aluminum isopropoxide is heated for a few minutes under nitrogen, the cyclohexanone is added, and the reaction mixture is heated, preferably on a steam bath. Compound IV may be isolated by adding a saturated solution of Rochelle salts with vigorous shaking to the reaction mixture, extracting with a suitable solvent, such as ether, removing the solvent by distillation under reduced pressure and steam distilling the residue. This residue is extracted with a suitable solvent, such as ether, drying the extract over anhydrous magnesium sulfate, filtering, and concentrating to dryness by distillation of the solvent under reduced pressure. The residue is Compound V.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure.

*Example 1.—Preparation of 17α-(3′-hydroxypropyl)-4-androstene-3β,17β-diol*

Disiamylborane is formed by adding 13.3 ml. of redistilled boron trifluoride etherate over a period of 30 minutes to a stirred solution of 2.99 g. of sodium borohydride in 63 ml. of tetrahydrofuran and 22.2 ml. of 2-methyl-2-butene. During the addition of the boron trifluoride etherate to the slurry, the reaction mixture is maintained at a temperature of from −5 to −10° C. and kept under an atmosphere of nitrogen. After addition is complete, the reaction mixture is stirred for 30 minutes at a temperature of 0° C. and then stirred for 2½ hours at a temperature of 25° C. At the end of the stirring period the reaction mixture is cooled to −20° C. and a solution of 9.9 g. of 17α-allyl-5-androstene-3β,17β-diol in 42 ml. of tetrahydrofuran is added at such a rate that the temperature of the reaction mixture is kept below −15° C. After addition is complete, the reaction mixture is stirred for 4 hours at a temperature of 0° C. The reaction mixture is then cooled to −15° C. and 32 ml. of 3 N sodium hydroxide solution are added at such a rate that the temperature rises to 0° C. when the addition is complete. Thirty-two milliliters of 30% hydrogen peroxide are then added and during the addition of this solution, the temperature is allowed to come to 25 to 30° C. After addition of hydrogen peroxide is complete, the reaction mixture is stirred for 1½ hours at room temperature and then sufficient 15% aqueous sodium bisulfite solution to decompose any excess hydrogen peroxide. The organic solvent is then removed by distillation under reduced pressure and the crystalline slurry which remains is diluted with water. The resulting slurry is chilled and filtered and the crystalline solid is obtained by filtration and is washed with cold water until neutral. The washed product is refluxed for 1 hour in 200 ml. of chloroform. The chloroform mixture is cooled and filtered. 10.2 grams of crystalline 17α-(3′-hydroxypropyl)-4-androstene-3β,17β-diol is obtained which has a melting point of 275–8° C. and an optical rotation [α]$_D$ −57.6 (c.=0.4, pyridine). The crystalline product may be further purified by recrystallization from pyridine.

*Example 2.—Preparation of 2′,3′α-tetrahydrofuran-2′-spiro-17-(3β-alkyl or aryl sulfonyloxy-4-androstene)*

A solution comprising 1.74 g. of 17α - (3′ - hydroxypropyl)-4-androstene-3β,17β-diol, 2.98 g. of para-toluenesulfonyl chloride in 34.8 ml. of pyridine is flushed with nitrogen and stirred for 16 hours while the temperature of the reaction mixture is maintained at about 0° C., at which time the reaction mixture is homogeneous. Two hundred milliliters of a mixture of water and ice are then added to the cold reaction mixture and the white precipitate which forms is removed by extraction with 75 ml. of ethyl acetate. The extract is washed with cold water, washed with dilute aqueous sulfuric acid solution until the pH of the extract is less than 3, washed with water and then washed with dilute aqueous sodium bicarbonate solution until the pH of the extract is greater than 8. The extract is dried over anhydrous magnesium sulfate, filtered and the solvent is removed by distillation under reduced pressure. The residual oil is taken up in hexane. 2′,3′α - tetrahydrofuran - 2′ - spiro - 17 - (3β - para-toluenesulfonyloxy - 4 - androstene) crystallizes from the hexane solution. 1.76 grams of product are obtained which has a melting point of 95–97° C.

*Analysis.*—Calc'd for $C_{29}H_{40}O_4S$: C, 71.87; H, 8.32; S, 6.59. Found: C, 72.06; H, 8.51; S, 6.82.

*Example 3.—Preparation of 2′,3′α-tetrahydrofuran-2′-spiro-17-(4-androsten-3-one)*

A solution of 0.4846 g. of 2′,3′α-tetrahydrofuran-2′-spiro - 17 - (3β - part - toluenesulfonyloxy - 4 - androstene) and 0.13 ml. of redistilled collidine in 5 ml. of dimethylsulfoxide is heated on a steam bath for 3 hours and then cooled to room temperature. Twenty-five milliliters of water are added to the cooled reaction mixture and the oily precipitate which forms is removed by extraction with ether. The ether extract is washed with water, washed with dilute aqueous sulfuric acid solution and washed with dilute aqueous sodium bicarbonate solution until the pH of the extract is greater than 8. The washed extract is dried over anhydrous magnesium sulfate, filtered and the solvent is removed by distillation under reduced pressure. The residue is 2′,3′α - tetrahydrofuran - 2′ - spiro - 17-(4-androsten-3-one) and is purified by chromatography on neutral alumina, using methylene chloride as the solvent. The purified product has a melting point of 93–95° C.

*Example 4.—Preparation of 2′,3′-α-tetrahydrofuran-2′-spiro-17-(5-androstene-3β-ol)*

A solution of 0.4846 g. of 2′,3′α-tetrahydrofuran-2′-spiro - 17 - (3β - para - toulenesulfonyloxy - 4 - androstene) in 5 ml. of water and 20 ml. of acetone is refluxed for 2 hours and then cooled to room temperature. One hundred milliliters of water are added to the cooled solution and the resulting solution is brought to a volume of 40 ml. by distillation under reduced pressure. The residual solution is cooled in an ice bath and the precipitate of 2′,3′α - tetrahydrofuran - 2′ - spiro - 17 - (5 - androstene-3β-ol) which forms is removed by filtration, washed with water and dried at room temperature under high pressure. 0.32 grams of dried product are obtained which has a melting point of 178–187° C.

*Example 5.—Preparation of 2′,3′α-tetrahydrofuran-2′-spiro-17-(4-androsten-3-one)*

A solution consisting of 4.95 g. of 2′,3′α-tetrahydrofurane-2′-spiro-17-(5-androstene-3β-ol), 19.2 ml. of a 20% solution of aluminum isopropoxide in benzene and 200 ml. of dry benzene is heated for 15 minutes on a steam bath under an atmosphere of nitrogen. The solution is cooled to 25° C. and 52 ml. of distilled cyclohexanone are added. The solution is again heated on a steam bath under nitrogen for 40 minutes and then cooled in an ice bath. A saturated aqueous solution of Rochelle salts is added with vigorous shaking and the product is removed by extraction with ether. The ether is removed from the extracts by distillation under reduced pressure and the residual solution is steam distilled. The steam distilled residue is extracted with ether and the ether solution is dried over anhydrous magnesium sulfate, filtered and the solvent is removed by distillation under reduced pressure. The residue is 2′,3′α - tetrahydrofuran - 2′ - spiro - 17-(4-androsten-3-one) and has a melting point of 93–95° C., [α] +41°, $\lambda_{max}$. 241 mμ (ε 15,700).

Various changes and modifications may be made in carrying out the present invention without departing from the spirit and scope thereof. Insofar as these changes and modifications are within the purview of the annexed claims, they are to be considered as part of our invention.

What is claimed is:

1. A process for the preparation of 17α-(3′-hydroxypropyl)-4-androstene-3β,17β-diol which comprises treating 17α-allyl-5-androstene-3β,17β-diol in solution in an inert organic solvent with the hydroboration agent having large steric requirements to provide an organoborane and oxidizing the organoborane with hydrogen peroxide under alkaline conditions.

2. A process according to claim 1 in which the hydroboration agent is disiamylborane.

3. A process according to claim 1 in which the hydroboration agent is thexylborane.

4. A process according to claim 1 in which the hydroboration agent is dicyclohexylborane.

5. A process according to claim 1 in which the hydroboration agent is diisopinocampheylborane.

6. A process according to claim 2 in which the inert organic solvent is tetrahydrofuran.

7. A process according to claim 2 in which the inert organic solvent is diglyme.

References Cited

UNITED STATES PATENTS 3,265,718   8/1966   Christiansen _____ 260—397.5

ELBERT L. ROBERTS, *Primary Examiner.*